United States Patent
Chan (10) Patent No.: US 10,779,674 B2
(45) Date of Patent: Sep. 22, 2020

(54) DOUBLE TUBE IMMERSION ELECTRONIC CIRCULATION COOKING DEVICE

(71) Applicant: PUC Perfect Union Co., Ltd., New Taipei (TW)

(72) Inventor: Ching Chan, New Taipei (TW)

(73) Assignee: PUC Perfect Union Co., Ltd., New Taipei (TW)

( * ) Notice: Subject to any disclaimer, the term of this patent is extended or adjusted under 35 U.S.C. 154(b) by 305 days.

(21) Appl. No.: 15/918,661

(22) Filed: Mar. 12, 2018

(65) Prior Publication Data

US 2019/0274463 A1    Sep. 12, 2019

(51) Int. Cl.
| A47J 27/10 | (2006.01) |
| A47J 27/12 | (2006.01) |
| A47J 36/00 | (2006.01) |
| A47J 43/044 | (2006.01) |
| A47J 27/00 | (2006.01) |

(52) U.S. Cl.
CPC ............. *A47J 27/10* (2013.01); *A47J 27/004* (2013.01); *A47J 27/12* (2013.01); *A47J 36/00* (2013.01); *A47J 43/044* (2013.01)

(58) Field of Classification Search
CPC .. A47J 27/10; A47J 27/12; A47J 27/18; A47J 27/21016; A47J 27/21033; H05B 3/78–80; H05B 3/82

USPC .................. 99/325, 330, 348, 409
See application file for complete search history.

(56) References Cited

U.S. PATENT DOCUMENTS

| 2016/0192801 A1* | 7/2016 | Wu ........................ A47J 27/10 426/231 |
| 2017/0089768 A1* | 3/2017 | Wu ........................ A47J 27/10 |
| 2019/0124722 A1* | 4/2019 | Young .................. H05B 1/0252 |
| 2019/0274463 A1* | 9/2019 | Chan ....................... A47J 27/12 |

* cited by examiner

*Primary Examiner* — Sarang Afzali
*Assistant Examiner* — Darrell C Ford
(74) *Attorney, Agent, or Firm* — Jackson IPG PLLC; Demian K. Jackson (57) ABSTRACT

A circulation cooking device includes a housing and two casings. Within the housing and the casings, there are provided two sets of a wheel control device, a temperature limiting thermostat, a circuit board for switch control, a mechanical fan for drawing cold air in and expelling hot air out, a main circuit board configured to activate heating and agitation; a drive source for agitation and testing, a support for heating member, an electric heating member, a fan blade assembly, and an inlet device. The circulation cooking device can mounted on a large container by a seat for single container or two small containers by a seat for double container.

4 Claims, 8 Drawing Sheets

DOUBLE TUBE IMMERSION ELECTRONIC CIRCULATION COOKING DEVICE

BACKGROUND OF THE INVENTION

1. Field of the Invention

The invention relates to food cooking devices and more particularly to a double tube immersion electronic circulation cooking device with improved characteristics.

2. Description of Related Art

Double tube is a method of cooking in which food is vacuum sealed in a plastic pouch and then placed in a water bath or steam environment for longer than normal cooking times, usually 1 to 7 hours, at an accurately regulated temperature much lower than normally used for cooking, typically around 55 to 60° C. for meat, higher for vegetables). The intent is to cook the item evenly, ensuring that the inside is properly cooked without overcooking the outside, and to retain moisture.

Sous-vide circulation cooking devices are well known in the art. For example, US Publication Number 20160022085 A1 to Wu et al. discloses a sous-vide circulation cooking device for home sous-vide cooking. Also, US Publication Number 20160192801 A1 to Wu discloses a circulation cooking device for sous-vide cooking.

The present inventor's U.S. application Ser. No. 15/607, 997, entitled "Sous-vide immersion electronic circulation cooker", is characterized by simple components and convenience in use. However, only one cooker or container is appropriate for the application. It is impossible of quickly thawing and/or cooking more than one food. Thus, the need for improvement still exists.

SUMMARY OF THE INVENTION

It is therefore one object of the invention to provide a circulation cooking device comprising a housing including a front member having two spaced front shells, and a rear member having two spaced rear shells wherein two opening members are formed on each front shell, two first recesses are formed on an underside of each front shell, a half circular first groove is formed on a joining portion of the first recesses and the underside of each front shell, a circuit board and an LCD (liquid-crystal display) display are disposed in the opening members respectively, and a transparent touchscreen is disposed on the opening members; and each rear shell includes a top opening, a plurality of lower openings, a plurality of upper openings, two second recesses formed on an underside, and a half circular second groove formed on a joining portion of the second recesses and the underside of each rear shell; two cylindrical casings detachably secured to the housing, each casing including a plurality of projections on an inner surface of an upper portion configured to dispose in the corresponding recesses, a vertical opening, and a plurality of horizontal openings; two inlet devices each mounted to a bottom of the casing and including a plurality of inlets; two sets each comprising a wheel control device disposed in the housing and including a wheel and a hollow fastening member with the wheel projecting out of its open top and further projecting out of the top opening; a temperature limiting thermostat disposed in the housing and including a temperature probe; a mechanical fan for drawing cold air from the lower openings and expelling hot air out of the housing via the upper openings; a main circuit board disposed in the housing and configured to activate heating and agitation; a circuit board for switch control being further configured to control the main circuit board: a drive source for agitation and testing disposed in the housing and including a motor, a motor shaft extending downward from the motor, and two probes for sensing temperature and for measuring water level respectively; a support for heating member disposed on a bottom of the housing and including an annular flange positioned in the first and second grooves seal the bottom of the housing; an electric heating member disposed in the casing and extending downward from the flange wherein the motor shaft, the probes for sensing temperature and for measuring water level, and the temperature probe pass the support for heating member to be proximate the electric heating member and wherein the temperature probe and the electric heating member are fastened together; a fan blade assembly fastened at a bottom end of the motor shaft and under the electric heating member; a ground having one end connected to the electric heating member; and two AC (alternating current) power cords each having one end passing through the rear shell to electrically connect to the main circuit board for supplying power thereto; and a seat for double, container including two spaced circular brackets, two flexible mounts extending downward from en intermediate portion between the brackets, a top cavity between the brackets, and a snapping member having two top latches and a plurality of ribs on either side wherein the snapping member is positioned between the mounts with the latches fastened in the cavity, the seat for double container is configured to mount onto two containers with each mount urging against an inner surface of the container and the ribs urging against an outer surface of each container, and the casings are inserted through the brackets to dispose in the containers.

The above and other objects, features and advantages of the invention will become apparent from the following detailed description taken with the accompanying drawings

DETAILED DESCRIPTION OF THE INVENTION

Figure 1:
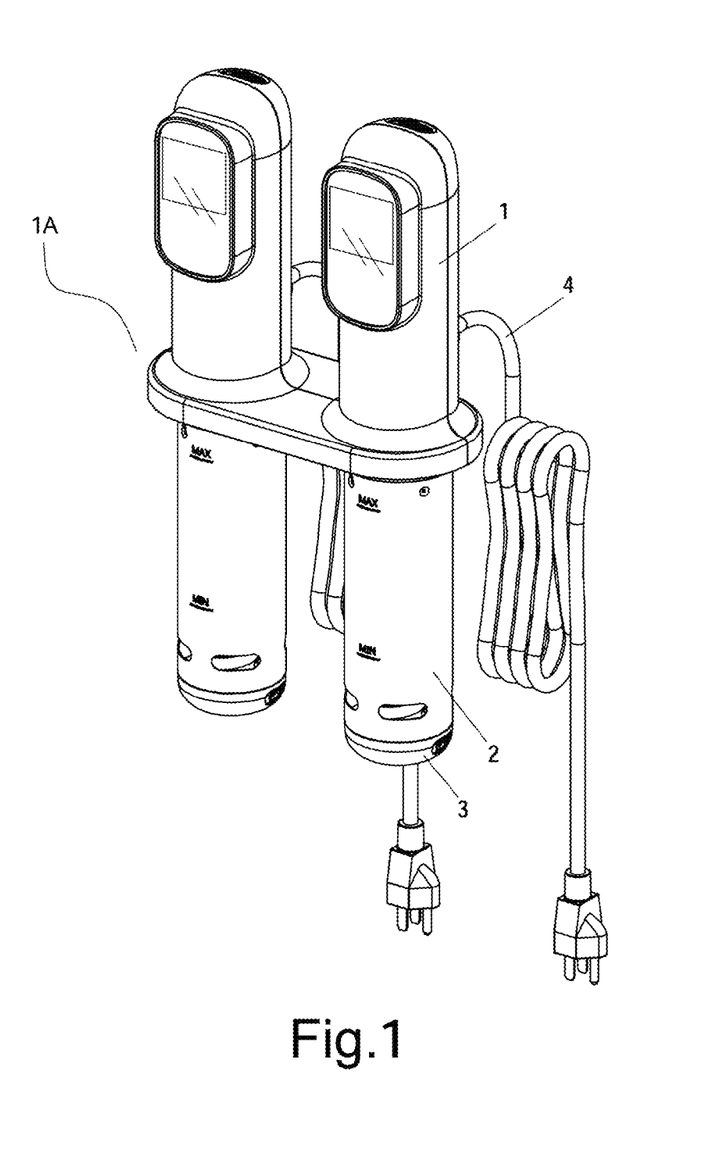
FIG. 1 is a perspective view of a double tube immersion electronic circulation cooking device according to the invention.
Figure 2:
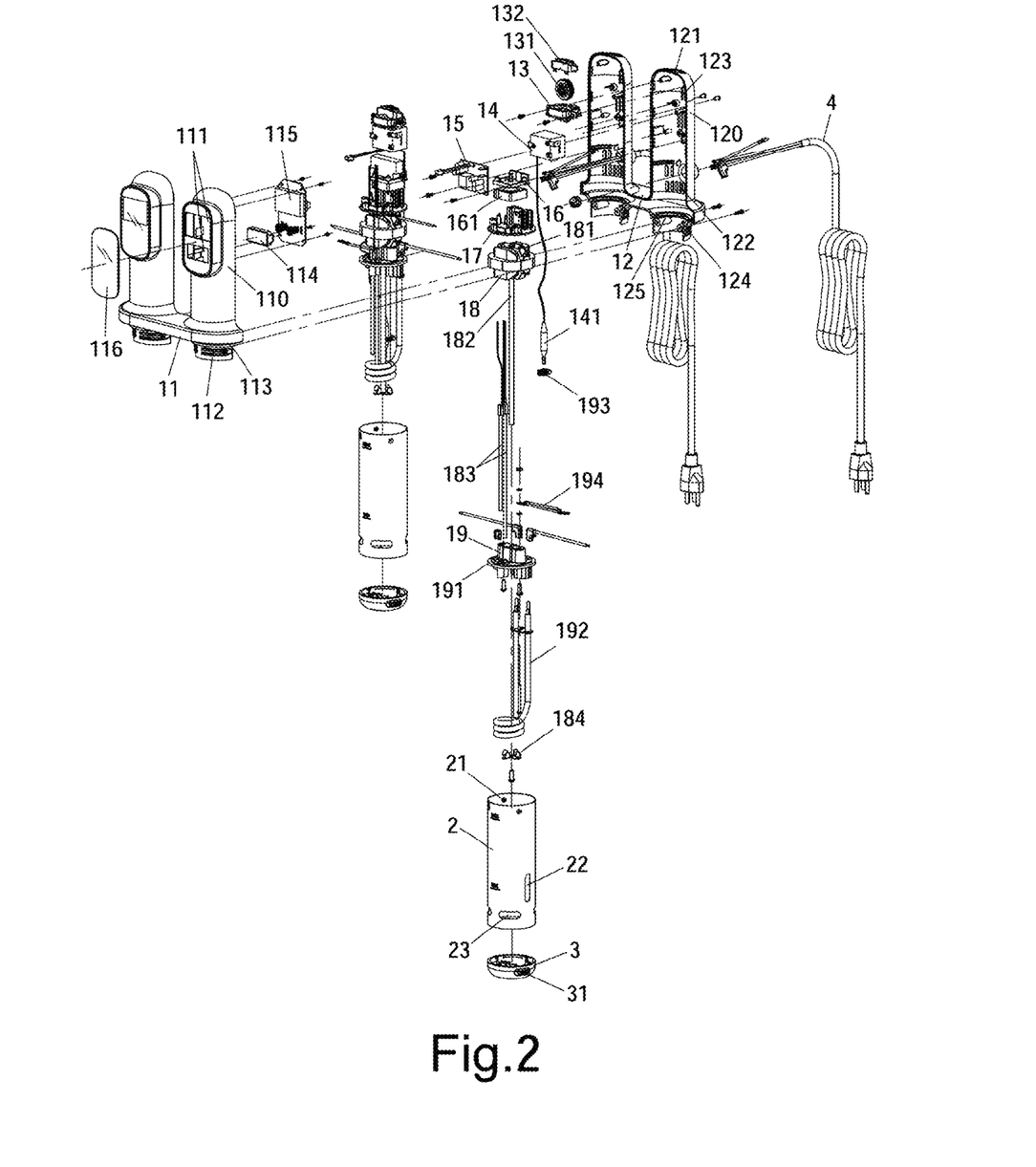
FIG. 2 is an exploded view of the double tube electronic circulation cooking device.

Referring to FIGS. 1 and 2, a double tube immersion electronic circulation cooking device 1A in accordance with the invention comprises the following components as discussed in detail below.

A housing 1 includes a front member 11 having two spaced front shells 110 and a rear member 12 having two spaced rear shells 120. The front member 11 and the rear member 12 are detachably secured together to form the housing 1 having an internal space. Two openings 111 are formed on a front surface of the front shell 110. Two recesses 112 are formed on an underside of the front shell 110 and a half circular groove 113 is formed on a joining portion of the recesses 112 and the underside of the front shell 110. A circuit board 114 and an LCD (liquid-crystal display) display 115 are provided in the openings 111 respectively. A transparent touchscreen 116 is provided on the openings 111.

The rear shell 120 includes a top opening 121, a plurality of lower openings 122, a plurality of upper openings 123, two recesses 124 formed on an underside, and a half circular groove 125 formed on a joining portion of the recesses 124 and the underside of the rear shell 120.

Within the housing 1 there are provided two sets of a wheel control device 13, a temperature limiting thermostat 14, a circuit board 15 for switch control, a fan mount 16, a main circuit board 17, a drive source 18 for agitation and testing, and a support 19 for heating member.

The wheel control device 13 includes a wheel 131 and a hollow fastening member 132 with the wheel 131 projecting out of its open top and further projecting out of the top opening 121. The temperature limiting thermostat 14 functions to limit temperature to a desired range. The temperature limiting thermostat 14 includes a temperature probe 141 electrically connected to the temperature limiting thermostat 14.

The circuit board 15 for switch control is electrically connected to a wire 4 which is in turn configured to connect to an outlet. A mechanical fan 161 is mounted on the fan mount 16 for drawing cold air from the lower openings 122 and expelling hot air out of the housing 1 via the upper openings 133. The main circuit board 17 acts to activate heating and agitation. The drive source 18 for agitation and testing includes an electric motor 181, a motor shaft 182 extending downward from the motor 181, and two probes 183 for sensing temperature and for measuring water level respectively. The support 19 for heating member is provided on a bottom of the housing 1 and includes an annular flange 191 positioned in both the groove 113 of one front shell 110 and the groove 125 of one rear shell 120 complimentary to one front shell 110. Thus, the bottom of the housing 1 is sealed. An electric heating member 192 extends downward from the flange 191. The motor shaft 162, the probes 183 for sensing temperature and for measuring water level, and the temperature probe 141 of the temperature limiting thermostat 14 pass the support 19 for heating member to be proximate the electric heating member 192. A fan blade assembly 184 is fastened at a bottom end of the motor shaft 182. A cable tie 193 is provided to fasten the temperature probe 141 and the electric heating member 192 together so that the temperature probe 141 may measure the temperature of the electric heating member 192. A ground 194 has one end connected to the electric heating member 192.

Two cylindrical casings 2 each have an open top and are configured to store a quantity of liquid. The casing 2 includes four equally spaced projections 21 on an inner surface of an upper portion configured to dispose in the corresponding recesses 112 and 124. Thus, the housing 1 and the casings 2 are fastened together. The casing 2 further comprises a vertical opening 22 for flowing liquid off, and a plurality of horizontal openings 23 adjacent to the bottom for flowing liquid off.

Two inlet devices 3 each include a plurality of inlets 31 for flowing water in. Two AC (alternating current) power cords 4 each have one end passing through the rear shell 120 to electrically connect to the main circuit board 17 for supplying power thereto. Consequently, power can be supplied from the main circuit board 17 to all electrical components of the invention. Further, the circuit board 114 is configured to control the main circuit board 17 for setting, operating, sensing, measurement, and information display.

Figure 3:
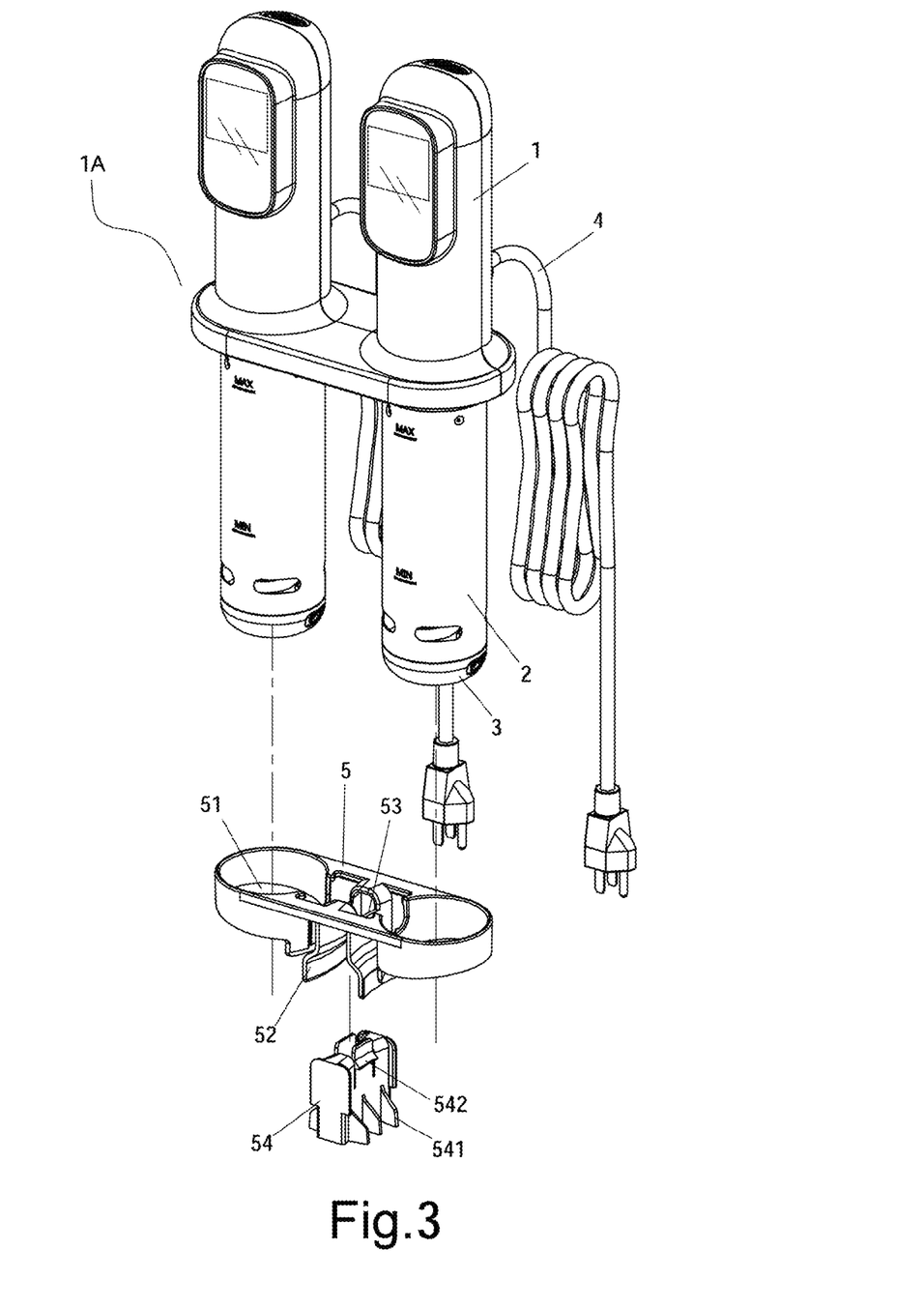
FIG. 3 is a perspective view of the double tube immersion electronic circulation cooking device and a seat for double container to be fastened together according to a first preferred embodiment of the invention.
Figure 4:
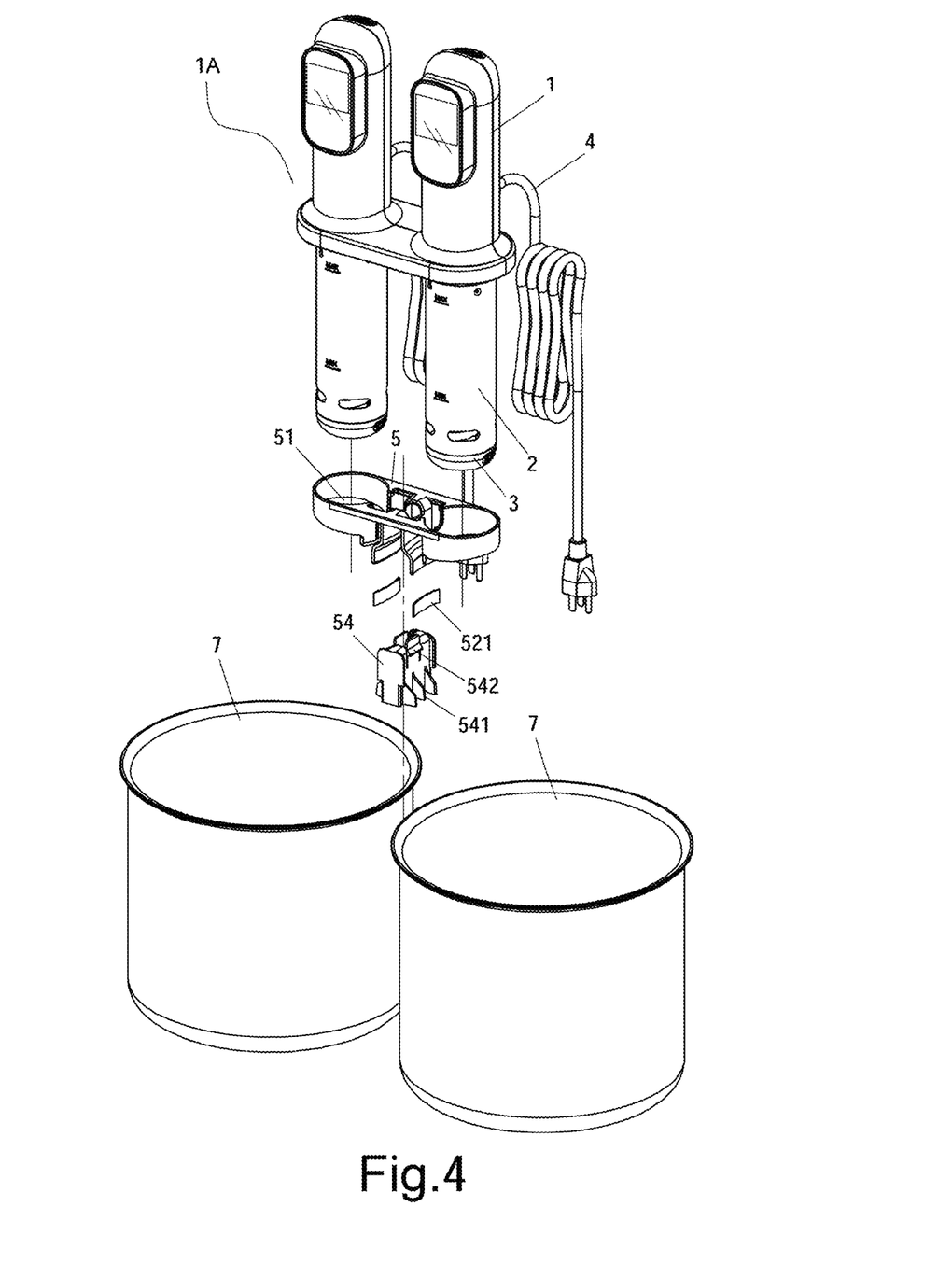
FIG. 4 is a view similar to FIG. 3 with the double tube immersion electronic circulation cooking device and the seat for double container to be mounted to two containers.
Figure 5:
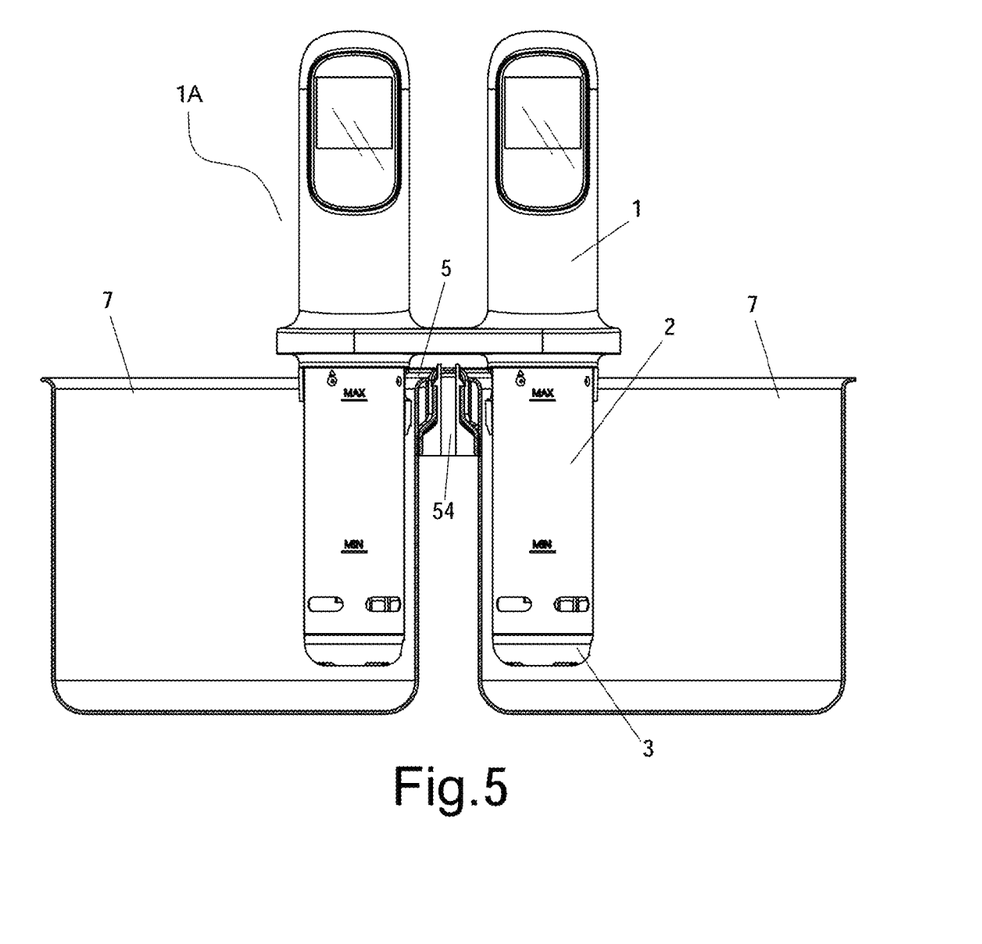
FIG. 5 is a side elevation of the double tube immersion electronic circulation cooking device mounted on the containers by using the seat for double container.

Referring to FIGS. 3, 4 and 5, a first preferred embodiment of the invention is characterized below. A seat 5 for double container is provided with two spaced circular brackets 51, two flexible mounts 52 extending downward from an intermediate portion between the brackets 51, a top cavity 53 between the brackets 51, and a snapping member 54 including two top latches 542 and a plurality of ribs 541 on either side.

In installation, a person may snap the snapping member 54 into a space between the mounts 52 until the latches 542 are fastened in the cavity 53. Next, the person may mount the seat 5 for double container onto two containers 7 with each mount 5$ urging against an inner surface of the container 7 and the ribs 541 urging against an outer surface of each container 7. Further, two pads 521 each are clamped between the mount 52 and the inner surface of the container 7, thereby enhancing the fastening of the mount 52 and the container 7. Finally, the casings 2 are inserted through the brackets 51 until upper portions of the casings 2 are stopped at a position proximate a joining portion of the housing 1 and the casino 2. At this position, a substantial portion of each casing 2 is disposed in the container 7. After powering the double tube immersion electronic circulation cooking device 1A, frozen food in the containers 7 can be thawed and further cooked.

Figure 6:
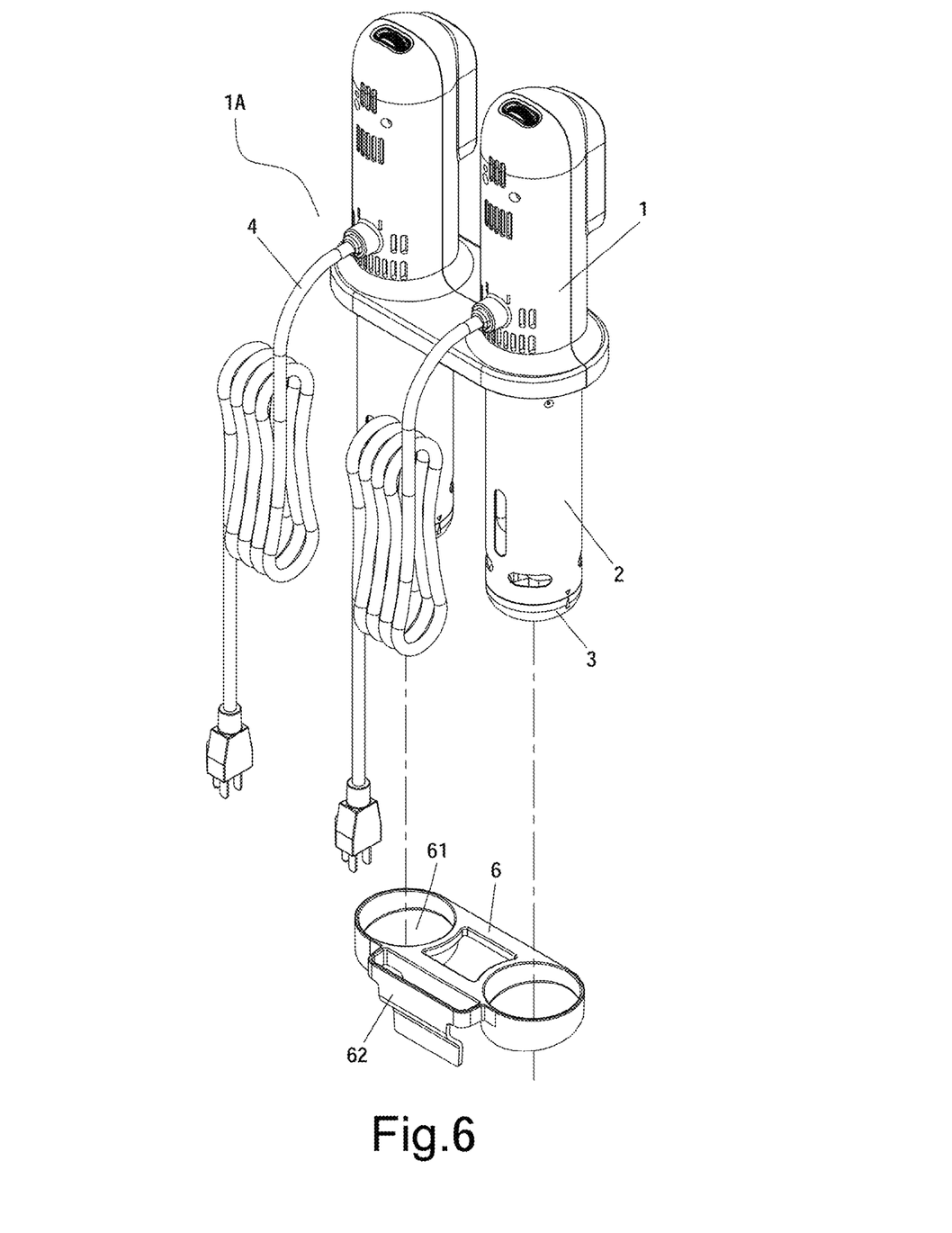
FIG. 6 is a perspective view of the double tube immersion electronic circulation cooking device and a seat for single container to be fastened together according to a second preferred embodiment of the invention.
Figure 7:
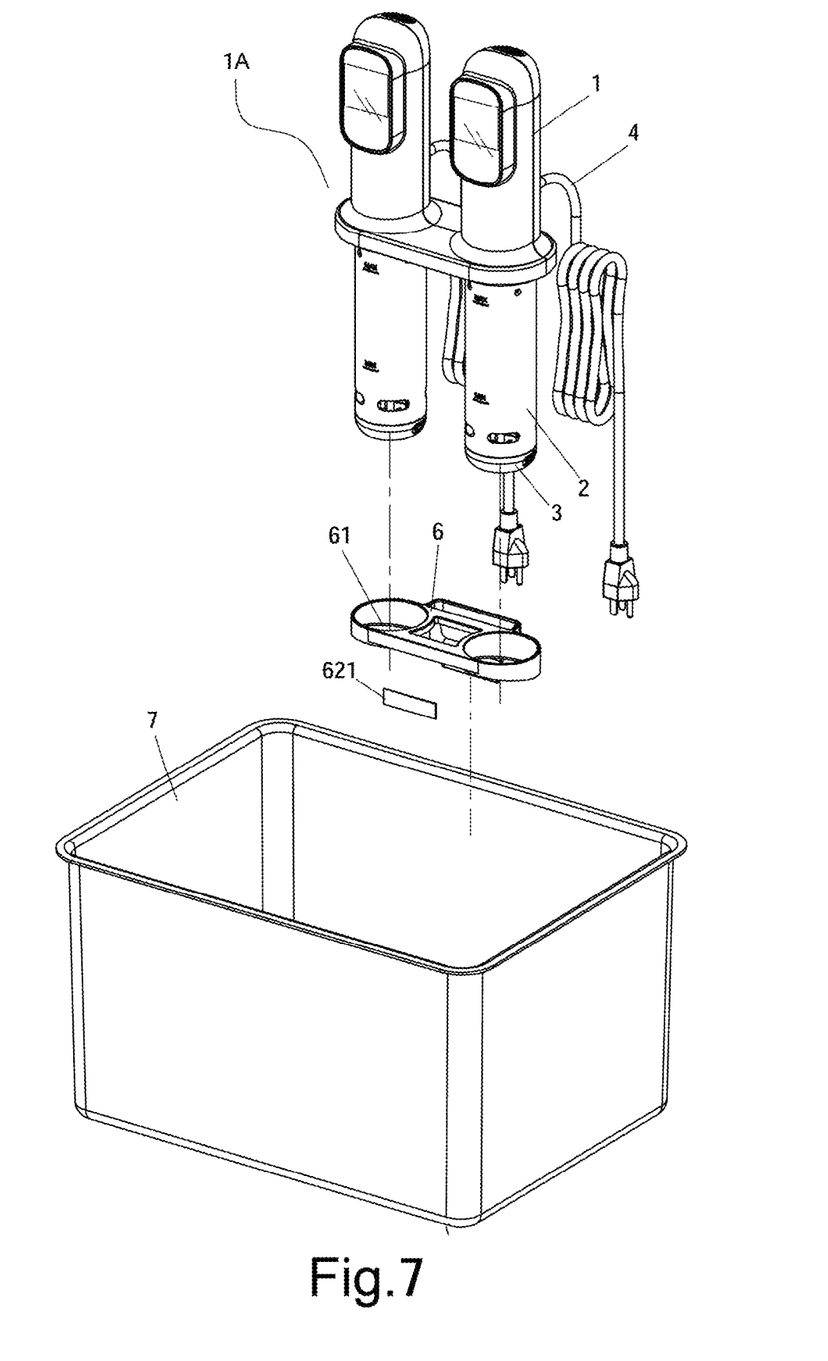
FIG. 7 is a view similar to FIG. 6 with the double tube immersion electronic circulation cooking device and the seat for single container to be mounted to a container.
Figure 8:
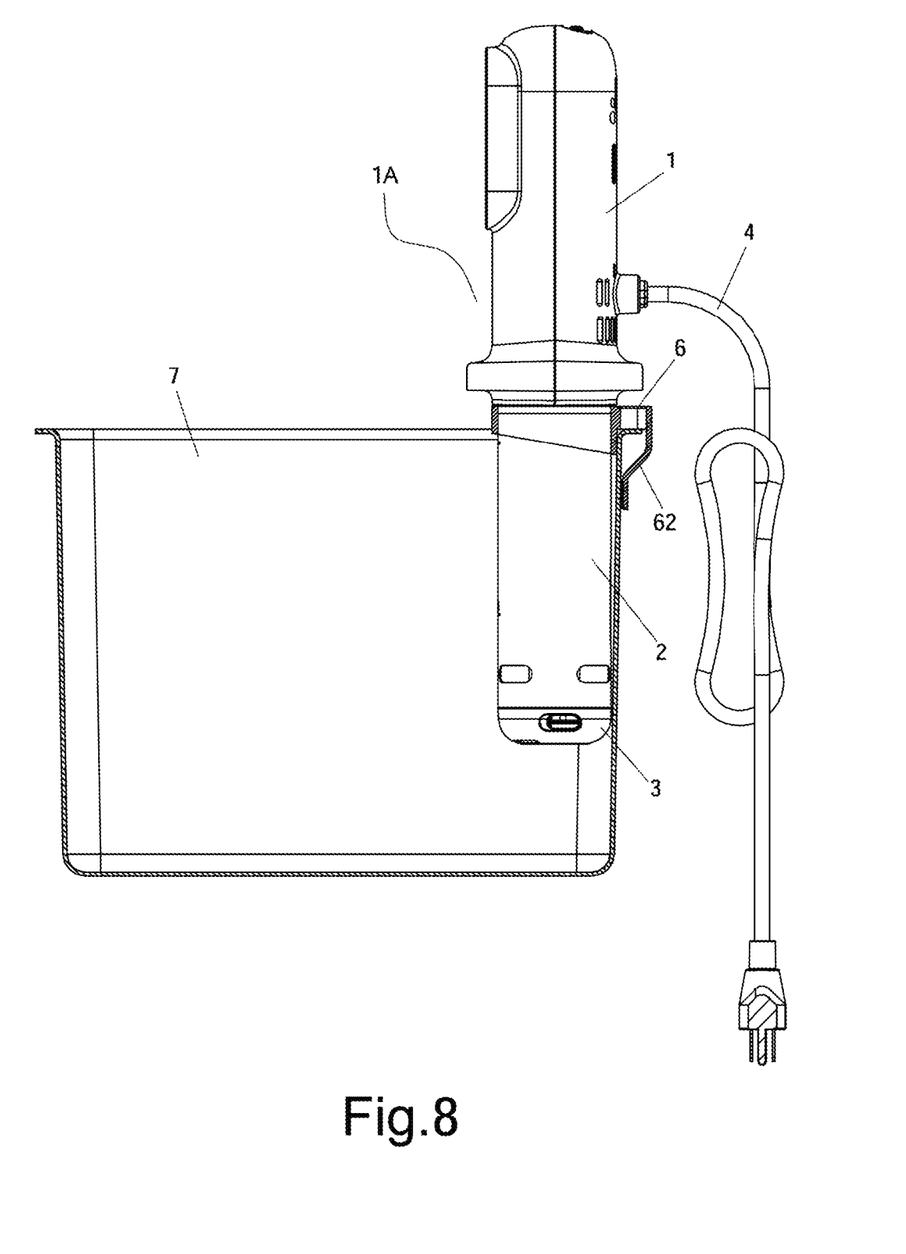
FIG. 8 is a side elevation of the double tube immersion electronic circulation cooking device mounted on the container by using the seat for single container.

Referring to FIGS. 6, 7 and 8, a second preferred embodiment of the invention is characterized below. A seat 6 for single container is provided with two spaced circular brackets 61 and a flexible clamp 52 extending between an outer surface of one bracket 61 to an outer surface of the other bracket 61.

In installation, a person may snap the clamp 62 onto a wall of the container 7 until being stopped. Further, a pad 621 is clamped between the clamp 62 and an outer surface of the container 7, thereby enhancing the fastening of the clamp 62 and the container 7. Finally, the casings 2 are inserted through the brackets 61 until upper portions of the casings 2 are stopped at a position proximate a joining portion of the housing 1 and the casing 2. At this positron, a substantial portion of each casing 2 is disposed in the container 7. After powering the double tube immersion electronic circulation cooking device 1A, frozen food in the container 7 can be thawed and further cooked.

While the invention has been described in terms of preferred embodiments, those skilled in the art will recognize that the it can be practiced with modifications within the spirit and scope of the appended claims.

What is claimed is:

1. A circulation cooking device comprising:
   a housing including a front member having two spaced front shells, and a rear member having two spaced rear shells wherein two opening members are formed on each front shell, two first recesses are formed on an underside of each front shell, a half circular first groove is formed on a joining portion of the first recesses and the underside of each front shell, a circuit board and a liquid-crystal display (LCD) are disposed in the opening members respectively, and a transparent touch-screen is disposed on at least one of the opening members; and each rear shell includes a top opening, a plurality of lower openings, a plurality of upper openings, two second recesses formed on an underside, and a half circular second groove formed on a joining portion of the second recesses and the underside of each rear shell;

two cylindrical casings detachably secured to the housing, each casing including a plurality of projections on an inner surface of an upper portion configured to dispose in the corresponding recesses, a vertical opening, and a plurality of horizontal openings;

two inlet devices, each mounted to a bottom of a respective cylindrical casing and including a plurality of inlets; and two sets each comprising:

a wheel control device disposed in the housing and including a wheel and a hollow fastening member with the wheel projecting out of an open top of the hollow fastening member and further projecting out of the top opening of a respective rear shell;

a temperature limiting thermostat disposed in the housing and including a temperature probe;

a mechanical fan for drawing cold air from the lower openings and expelling hot air out of the housing via the upper openings;

a main circuit board disposed in the housing and configured to activate heating and agitation;

a circuit board for switch control being further configured to control the main circuit board;

a drive source for the agitation and for testing disposed in the housing and including a motor, a motor shaft extending downward from the motor, and two probes for sensing temperature and for measuring water level respectively;

a support disposed on a bottom of the housing and including an annular flange positioned in the first and second grooves to seal the bottom of the housing;

an electric heating member disposed in the casing and extending downward from the flange wherein the motor shaft, the probes for sensing temperature and for measuring water level, and the temperature probe pass the support and the electric heating member to be proximate the electric heating member, and wherein the temperature probe and the electric heating member are fastened together;

a fan blade assembly fastened at a bottom end of the motor shaft and under the electric heating member;

a ground having one end connected to the electric heating member;

two AC (alternating current) power cords each having one end passing through the rear shell to electrically connect to the main circuit board for supplying power thereto; and a seat including two spaced circular brackets, two flexible mounts extending downward from an intermediate portion between the brackets, a top cavity between the brackets, and a snapping member having two top latches and a plurality of ribs on either side wherein the snapping member is positioned between the mounts with the latches fastened in the cavity, the seat is configured to mount onto two containers with each mount urging against an inner surface of the respective container and the ribs urging against an outer surface of each container, and the casings are inserted through the brackets to dispose in the containers.

2. The circulation cooking device of claim 1, further comprising two pads each configured to be clamped between the mount and an inner surface of a container.

3. A circulation cooking device comprising:

a housing including a front member having two spaced front shells, and a rear member having two spaced rear shells wherein two opening members are formed on each front shell, two first recesses are formed on an underside of each front shell, a half circular first groove is formed on a joining portion of the first recesses and the underside of each front shell, a circuit board and a liquid-crystal display (LCD) are disposed in the opening members respectively, and a transparent touch-screen is disposed on the opening members; and each rear shell includes a top opening, a plurality of lower openings, a plurality of upper openings, two second recesses formed on an underside, and a half circular second groove formed on a joining portion of the second recesses and the underside of each rear shell;

two cylindrical casings detachably secured to the housing, each casing including a plurality of projections on an inner surface of an upper portion configured to dispose in the corresponding recesses, a vertical opening, and a plurality of horizontal openings;

two inlet devices each mounted to a bottom of the casing and including a plurality of inlets; and two sets each comprising:

a wheel control device disposed in the housing and including a wheel and a hollow fastening member with the wheel projecting out of an open top of the hollow fastening member and further projecting out of the top opening of a respective rear shell;

a temperature limiting thermostat disposed in the housing and including a temperature probe;

a mechanical fan for drawing cold air from the lower openings and expelling hot air out of the housing via the upper openings;

a main circuit board disposed in the housing and configured to activate heating and agitation;

a circuit board for switch control being further configured to control the main circuit board;

a drive source for the agitation and for testing disposed in the housing and including a motor, a motor shaft extending downward from the motor, and two probes for sensing temperature and for measuring water level respectively;

a support disposed on a bottom of the housing and including an annular flange positioned in the first and second grooves to seal the bottom of the housing;

an electric heating member disposed in the casing and extending downward from the flange wherein the motor shaft, the probes for sensing temperature and for measuring water level, and the temperature probe pass the support and the electric heating member to be proximate the electric heating member, and wherein the temperature probe and the electric heating member are fastened together;

a fan blade assembly fastened at a bottom end of the motor shaft and under the electric heating member;

a ground having one end connected to the electric heating member;

two AC (alternating current) power cords each having one end passing through the rear shell to electrically connect to the main circuit board for supplying power thereto; and a seat for single container including two spaced circular brackets and a flexible clamp extending between an outer surface of one bracket to an outer surface of the other bracket; wherein the clamp is configured to mount onto a wall of a container, and the casings are inserted through the brackets to dispose in the container.

4. The circulation cooking device of claim 3, further comprising a pad configured to be clamped between the clamp and an outer surface of a container.

* * * * *